Patented Jan. 22, 1952

2,583,450

UNITED STATES PATENT OFFICE 2,583,450

AMINO ALCOHOL ESTERS OF ALIPHATIC, ALICYCLIC CARBOXYLIC ACIDS

Charles H. Tilford, Silverton, and Marcus G. Van Campen, Jr., Wyoming, Ohio, assignors to The Wm. S. Merrell Company, Cincinnati, Ohio, a corporation of Delaware No Drawing. Application March 22, 1948, Serial No. 16,395

5 Claims. (Cl. 260—468)

This invention relates to new amino alcohol esters of aliphatic, alicyclic carboxylic acids. The new esters are of therapeutic value, in general having antispasmodic action on normal smooth muscle as well as against histamine-induced, neurotropic and musculotropic spasms of the smooth muscle, and which, despite their physiological activity, are nevertheless quite free from undesirable side reactions, such as irritation or vasopressor effects, and have a suitably low toxicity.

The new compounds of the invention are the esters of amino alcohols with 1-aliphatic substituted alicyclic carboxylic acids having the formula:

$$RR_1COOH$$

in which R is an alkyl or substituted alkyl group and $R_1$ is alicyclic. $R_1$ may be further substituted by other groups such as amino groups, hydroxy groups, alkyl groups and the like. The new compounds are thus characterized structurally by a direct carboxylic-alicyclic linkage in which the ring atom is bound to an aliphatic grouping.

The amino alcohols which are esterified to produce the new compounds of the invention include primary, secondary and tertiary amino alcohols, that is, amino alcohols in which 1, 2 or 3 of the hydrogen atoms of ammonia is or are replaced by an alkyl or substituted alkyl group, including those in which the nitrogen forms a part of a heterocyclic ring structure as in the piperidine compounds. The amino alcohol may contain one or more amino groups, and one or more hydroxy groups, at least one amino group and one hydroxyl group being necessary.

The new compounds of the invention may be prepared as free bases or as their acid addition salts, and the invention includes both forms of the new compounds. In general, for therapeutic purposes, the compounds will be used in the form of their salts, most commonly in the form of the hydrochloride. In general, the free bases are oils and the hydrochlorides are crystalline products which are readily purified and conveniently used. Other salts, such as the phosphates, sulfates, tartrates, glycolates, levulinates, etc., may be readily prepared, as by neutralization of the free base with the selected acid, and are included within the invention. In general, because of convenience of preparation, the compounds will ordinarily be produced in the form of their salts, but these are readily converted to the free bases by treatment with an alkali such as sodium carbonate in the customary way. The invention also includes the quaternary ammonium derivatives of the amino alcohol esters, including those prepared by the alkylation of tertiary amino alcohols, as by treatment with alkyl halides; e. g. ethyl bromide.

A convenient way of preparing most of the new compounds is by trans- or reesterification of the corresponding simple alkyl esters of the selected carboxylic acid with an amino alcohol, usually under conditions such that there is separation of liberated alcohol by distillation, using an inert solvent, such as xylene or toluene, and advantageously with the use of a catalyst, such as sodium. The reesterification proceeds smoothly and relatively good yields of the desired products are obtained. The quaternary ammonium compounds may be prepared by the alkylation of a corresponding tertiary amino ester, as with an alkyl salt, such as an alkyl bromide.

The production of new compounds of the invention will be illustrated by the following specific examples, but the invention is not limited thereto.

*Example I.**β-Diethylaminoethyl-1-n-amylcyclohexanecarboxylate hydrochloride*

The ethyl ester of 1-n-amylcyclohexane carboxylic acid is first prepared, conveniently by alcoholysis of 1-n-amylcyclohexanecyanide. One mole of this nitrile is reacted with a large excess, say 10:1 by weight, of concentrated sulfuric acid and with a large excess of ethyl alcohol. The mixture is refluxed vigorously for a period of 48 hours, and the unchanged alcohol is then removed by vacuum distillation. The residue is poured into approximately an equal volume of ice water, and the oil which separates is extracted with petroleum ether, the extracts combined and heated on a steam bath to remove the ether. The resulting crude ester may be used directly for the reesterification operation or it may be distilled to purify it first. A mixture of the ester so obtained with a moderate excess of β-diethylaminoethanol say 1.5:1 in dry xylene are placed in a reaction vessel with a small quantity of sodium, i. e., 0.1 mole. The vessel is heated in an oil bath and the xylene-ethanol azeotrope is distilled off over a period of 2 to 3 hours. The distillate is cooled and shaken with about 3 times its volume of water, the decrease in volume of the distillate being considered a measure of the amount of alcohol formed. When 80–90% of the theoretical amount of alcohol is obtained in the distillate the reaction mixture is subjected to vacuum distillation to remove most of the xylene and unreacted diethylaminoethanol. The residue is poured into an excess of benzene which is then extracted 3 times with equal portions of water. The washed benzene layer is diluted with an equal volume of ether and alcoholic hydrochloric acid is added until the mixture is acid to Congo red. A white crystalline solid forms which may be purified by recrystallization by solution in alcohol and dilution with ether to the point where precipitation starts. A few drops of butanone are added, the solution is cooled to −10° C., and filtered to recover the crystals which separate. The product is obtained in the form of a crystalline solid melting at 121° C., in good yield.

*Example II.—β-Diethylaminoethyl-1-n-hexylcyclohexanecarboxylate hydrochloride*

1-n-hexylcyclohexanecyanide is converted to the corresponding ethyl carboxylate by alcoholysis following the procedure outlined in Example I, and the ethyl ester of the 1-n-hexylcyclohexanecarboxylic acid so obtained is subjected to reesterification with β-diethylaminoethanol. The ester obtained is purified, following the method of Example I. The product is finally obtained as the hydrochloride in crystalline form melting at 100–103° C.

*Example III.—β-Diethylaminoethyl-1-methyl-3-isopropylcyclopentanecarboxylate hydrobromide*

In analogous fashion, 1-methyl-3-isopropylcyclopentane cyanide is converted to the corresponding ethyl carboxylate according to the procedure of Example I, and the ethyl ester of the 1-methyl-3-isopropylcyclopentane carboxylic acid obtained is subjected to reesterification with β-diethylaminoethanol. The ester is recovered as the hydrobromide melting at 109–111° C. following the method of Example I but using hydrobromic acid in place of hydrochloric acid.

*Example IV.—β-Dimethylaminoethyl 1-n-amylcyclohexanecarboxylate hydrochloride*

By the use of β-dimethylaminoethanol in the reesterification operation of Example I, and otherwise following the directions of that example, the dimethylamino alcohol ester is obtained.

*Example V.—1-piperidino - 2 - hydroxy-3-(1'-n-amylcyclohexanecarboxy)-propane hydrochloride*

By the use of ethyl-1-n-amylcyclohexanecarboxylate and an excess of 1-piperidino-2,3-propanediol in the reesterification operation otherwise carried out as in Example I, this monoester hydrochloride is obtained.

*Example VI.—β-Triethylammoniumethyl - 1 - n-hexylcyclohexanecarboxylate bromide*

Treatment of β-diethylaminoethyl-1-n-hexylcyclohexane carboxylate with ethyl bromide gives this product in good yield.

Products of the structural characteristics illustrated in the foregoing examples exhibit valuable pharmacological properties, in particular having pronounced antispasmodic action on normal smooth muscle. In addition, the products generally possess definite sedative action, in some cases sufficiently pronounced so that simultaneous administration of a sedative with them when used for antispasmodic purposes is unnecessary. The compounds also have the property of neutralizing the physiological action of histamine indicating usefulness in combating allergies. The compounds also have usefulness as analgesics. Administration of the compounds may be oral or parenteral, and ordinarily one of the acid addition salts is used.

In addition to the compounds described in the foregoing examples which are intended primarily to describe suitable methods of preparation of the new compounds, the invention includes other amino alcohol esters of 1-aliphatic substituted alicyclic carboxylic acids and their acid addition and quaternary ammonium salts. The amino alcohol group used to esterify the carboxy acid may be derived from any one of a wide range of amino alcohols, including primary, secondary and tertiary amine derivatives, that is, compounds in which 1, 2 or 3 of the hydrogen atoms of ammonia are replaced by alkyl or alkylol groups or in which the nitrogen forms part of a ring structure as in piperidine derivatives, and may contain more than one amino group, as in the case of 1,3-bisdiethylaminopropane-2-ol, and may contain more than one alcoholiform hydroxyl group, as in the case of 1-piperidino-2,3-propanediol, as well as quaternary ammonium compounds corresponding to such tertiary amino alcohols, but with the nitrogen further substituted, as by an alkyl, alicyclic, aralkyl or aryl group. Included among the compounds of the invention are the esters of the following amino alcohols:

Diethylaminoethanol,
Dimethylaminoethanol,
1-piperidino-2-hydroxy-propane,
1-piperidino-2-phenylurethan - 3 - hydroxy-propane,
1,3-bis-diethylamino-2-hydroxy-propane,
4-hydroxy-3,4-dimethyleneoxy-oxazolidine,
β,β',β''-Trihydroxytertiarybutylamine,
Ethylaminoethanol,
Isopropylaminoethanol,
Diethylaminobutanol,
Dimethylaminocyclohexanol,
Diethylaminocyclopentanol,
β-Isopropylaminoethanol,
β-Isobutylaminoethanol,
β-Isopropylaminoisopropanol,
β-Ethylaminoisopropanol,
3-isopropylaminopropanol,
Propanolamine,
Ethanolamine,
4-hydroxypiperidine, and other amino alcohols, and the following quaternary ammonium alcohols, among others, named in terms of their cations:

Triethylammonium ethanol,
Diethylmethylammonium ethanol,
Ethyldimethylammonium ethanol,
1-(methylpiperidium)-2-hydroxy-propane,
Ethyldimethylammonium cyclohexanol,
Diethylcyclohexylammonium ethanol,
Benzyldiethylammonium ethanol,
Phenyldimethylammonium ethanol.

The carboxylic acids useful, however, are limited to the 1-aliphatic substituted alicyclic carboxylic acids where there is a direct alicyclic-carboxylic group linkage and the same ring atom is further substituted by an aliphatic chain grouping. The alicyclic group may be a substituted or unsubstituted, saturated or unsaturated ring such as cyclohexane, cyclohexene, cyclopentane, cyclobutane and the like. The cyclohexane carboxylic acids, however, comprise a particularly useful group of starting materials. The aliphatic substituent is advantageously a simple alkyl group containing up to seven or perhaps more carbon atoms in the chain. The activity of the product appears to increase with the length of the chain as the methyl derivatives are weakly active, while the n-amyl-and n-hexyl-derivatives possess special merit. The chain may be branched as well as straight, and the 1-isobutyl-and 1-isoamyl-alicyclic carboxylic acids form useful esters by way of illustration. The size, shape and chemical constitution of the chain may be further modified by substitution, for the esters of 1-$\beta$-cyclohexylethyl-, 1-$\beta$-phenoxyethyl-, 1-$\beta$-diethylaminoethyl- and 1-$\alpha$-thienylmethyl ($C_4H_3S$—$CH_2$—) -alicyclic carboxylic acids, for example, are useful for the purposes of this invention.

We claim:
1. Compounds of the formula

$$RR_1COOR_2NR_3R_4$$

in which R is selected from the group consisting of cyclohexyl and cyclopentyl radicals and monoalkyl substituted cyclohexyl and cyclopentyl radicals with the proviso that the alkyl substituent has one to three carbon atoms, $R_1$ is an alkyl group having one to six carbon atoms linked to the ring structure at the 1-position, $R_2$ is selected from the group consisting of alkylene and hydroxy alkylene groups having not more than three carbon atoms and $NR_3R_4$ is a secondary amine radical having not more than six carbon atoms.

2. An ester of $\beta$-diethylamino ethanol and a 1-lower alkyl, cyclohexane monocarboxylic acid.

3. An ester of $\beta$-diethylaminoethanol and a 1-lower alkyl, cyclopentane monocarboxylic acid.

4. $\beta$ - Diethylaminoethyl-1-n-amylcyclohexane carboxylate.

5. $\beta$ - Diethylaminoethyl-1-n-hexylcyclohexane carboxylate.

CHARLES H. TILFORD.
MARCUS G. VAN CAMPEN, Jr.

REFERENCES CITED

The following references are of record in the file of this patent:

UNITED STATES PATENTS

| Number | Name | Date |
|---|---|---|
| 1,965,792 | Chaux | July 10, 1934 |
| 2,265,185 | Miescher et al. | Dec. 9, 1941 |
| 2,265,188 | Miescher et al. | Dec. 9, 1941 |
| 2,404,588 | Martin et al. | July 23, 1946 |